United States Patent Office  3,000,825  Patented Sept. 19, 1961

3,000,825
LUBRICANTS CONTAINING METAL SALTS OF OXONATED POLYMERS
Graham G. Wanless, Westfield, Arnold J. Morway, Clark, Jeffrey H. Bartlett, New Providence, and Clifford W. Muessig, Roselle, N.J., assignors to Esso Research and Engineering Company, a corporation of Delaware
No Drawing. Filed Dec. 23, 1958, Ser. No. 782,372
8 Claims. (Cl. 252—41)

This invention relates to salts of monocarboxylic acids derived from oxonated polyolefins. Particularly, the invention relates to oxonated products of polyolefins, which are fused with caustic alkali to form alkali metal salts of monocarboxylic acids, which salts may be used as thickeners in the preparation of lubricating compositions.

A method has now been found for preparing alkali metal salts of high molecular weight aliphatic monocarboxylic acids from inexpensive and readily available petroleum sources, thus offering new and valuable materials for grease making. In this method, the alkali metal salts of the invention are producted by first oxonating high molecular weight polyolefins to form a mixture of aldehydes and alcohols, which mixture is then fused with caustic alkali to form salts of monocarboxylic acids. If desired, the salts in turn can be treated with a mineral acid to spring the organic acid, which organic acid can be converted into a salt of a metal other than an alkali metal. However, preferably the alkali metal salts are used as thickeners, thus avoiding the acid recovery step.

The polyolefins which are oxonated, are those having molecular weights of about 500 to 10,000 e.g. 600 to 2,000, prepared by polymerization of $C_2$ to $C_{20}$, e.g. $C_2$ to $C_{10}$ aliphatic mono- or diolefin hydrocarbons having alpha or beta unsaturation. Examples of such polymers include homopolymers such as: polyethylene, polypropylene, polyisobutylene, polybutene-1, polydecalene or polymers derived from monoolefins containing traces of diolefins such as butadiene, isoprene, piperylene and also copolymers derived from 2 or more of said mono- or diolefins.

Polyolefins of the above type and the various methods of preparing them are well known to the art. One such method, which was used to prepare several of the polyolefins used in the examples of the invention, is by polymerizing the olefin in the presence of a "catalyst complex" which results from the reaction of a monomeric olefin, e.g. ethylene, with a metal halide, such as aluminum chloride, dispersed in a light mineral oil fraction, e.g. heptane. The reaction of the monoolefin with the metal halide occurs at about 90° to 120° C. The resulting catalyst in turn, is then used to form the polyolefin by adding additional monoolefin with the agitated complex catalyst, at a controlled temperature of 90–150° C., and a pressure dictated by the vapor pressure of the olefin being polymerized. This method was followed in preparing several of the olefin polymers used in the examples of the invention, and is well known in the art. Similar polymeric materials made by other methods may also be employed as the method of preparation of the polymer is not critical to the present invention and forms no part thereof.

The olefin polymer is oxonated by the first stage, (aldehyde synthesis stage) of the well known Oxo process. This process involves reacting the olefin polymer with carbon monoxide and hydrogen, in the presence of a catalyst, such as a cobalt carbonyl catalyst at temperatures of about 200 to 400° F. and pressure of about 30 to 400 atmospheres. Ratios of 0.5 to 10.0 volumes of hydrogen per volume of carbon monoxide may be used, while preferred ratios are about one mole of hydrogen per mole of carbon monoxide. Generally, about 2500 to 15,000 cubic feet of the carbon monoxide and hydrogen gas per barrel of olefin feed is used, depending of course upon the molecular weight of the polyolefin and degree of unsaturation. The resulting product will be a mixture of aldehydes and primary alcohols. A lubricating grease can be formed by fusing the oxonation product with a caustic alkali directly in a lubricating oil medium. This alkali fusion is carried out as follows:

Alkali metal hydroxides such as sodium hydroxide or potassium hydroxide, preferably in flake or pellet form, or molten hydroxide are dispersed in the mineral lubricating oil menstruum. This mixture is then heated to about 450 to 700° F., e.g. 525 to 625° F., whereupon the oxonation product can be slowly added either in increments or continuously over a period of 1 to 15 hours, e.g. 1 to 5 hours, while vigorously stirring and maintaining a reaction temperature of about 450 to 750° F. After addition of the oxonation product, heating is then continued at these temperatures for about 1 to 10, e.g. 1 to 3 hours, until the desired conversion to the salt is obtained. The reaction mixture is then cooled to form a grease. By careful selection of proportions, greases of any desired penetration may be prepared, or a grease concentrate may be thereby prepared which may be cut-back with additional lubricating oil.

Preferably, the fusion salt is used in conjunction with other fatty acid salts to form mixed-salt complex type thickeners. Such complex thickeners will comprise the metal salts of about 0.5 to 5 e.g. 1 to 3 moles of a low molecular weight fatty acid per mole of the fusion acid. The complex may additionally contain about 0.5 to 2, e.g. 0.5 to 1 mole of intermediate and/or high molecular weight fatty acid per mole of the fusion acid. Either fluid lubricants or greases may be prepared containing 1.0 to 40.0 weight percent, e.g. 3 to 35 weight percent of the complex, said weight percent being based on the total weight of the composition.

Suitable low molecular weight acids for forming the mixed-salt complex include saturated and unsaturated, substituted and unsubstituted aliphatic mono- and polycarboxylic acids having about 1 to 6 carbon atoms. These acids include fatty acids such as formic, acetic, propionic, and similar acids including their hydroxy derivatives such as lactic acid, or their anhydrides when they exist. Acetic acid or its anhydride is preferred.

Intermediate molecular weight fatty acids which may be used include those aliphatic saturated or unsaturated, unsubstituted, monocarboxylic acids containing 7 to 12 carbon atoms per molecule, e.g. capric, caprylic, nonanoic, lauric acid, etc.

The high molecular weight fatty acids or aliphatic monocarboxylic acids useful for forming the mixed-salts of the invention include naturally-occurring or synthetic, substituted or unsubstituted, saturated or unsaturated, mixed or unmixed fatty acids having about 13 to 30, e.g. 16 to 24 carbon atoms per molecule. Examples of such acids include myristic, palmitic, stearic, hydroxy stearic, such as 12-hydroxy stearic, di-hydroxy stearic, polyhydroxy stearic and other saturated hydroxy fatty acids, arachidic, oleic, ricinoleic, hydrogenated fish oil, tallow acids, etc.

The lubricating oil present during the fusion step will preferably be a mineral lubricating oil or a polyolefin oil. After fusion, other synthetic lubricating oils may be used to dilute the product if desired.

Various additives may also be added to the lubricating composition, (e.g. 0.1 to 10.0 weight percent) of oxidation inhibitors such as phenyl alpha-naphthylamine; corrosion inhibitors, such as sorbitan monooleate; dyes; other grease thickeners, and the like.

The mixed-salt lubricating compositions of the invention will generally be prepared by carrying out the fusion reaction in the presence of the fatty acids. Thus, the fatty acids and the oxonated product are added to a lubricating oil, then the alkali metal base is added, followed by heating to a temperature of about 450 to 700° F., e.g., 500 to 650° F., until a mixed-salt complex thickener has been formed, say about ½ to 2 hours. The mixture may then be cooled to about 150 to 200° F., where any additives may be added. The resulting lubricant may then be homogenized such as by passing it through a Gaulin homogenizer or a Charlotte mill, followed by subsequent cooling to room temperature.

The invention will be further understood by the following examples, which include preferred embodiments of the invention.

EXAMPLE I

Polyethylene having an average molecular weight of about 600 was prepared as follows:

330 g. of reagent grade aluminum chloride was dispersed in 2500 g. of hexane in a 2 gal. stirred and jacketed autoclave. Ethylene was pressured into the reactor until a pressure of 500 p.s.i.g. is reached. The reactor contents were then heated until an initial reaction began at 90–110° C. At this point a runaway temperature was prevented by introducing cooling water through an internal cooling coil in the reactor. After the initial peak reaction has occurred and the "gemisch" catalyst was formed, additional ethylene was forced into the reactor under a pressure of 400 p.s.i.g., while the reactor temperature was maintained at 110° C. This operation was continued as long as the catalyst remained active and the reaction mixture continued to absorb ethylene at this specified reaction temperature. About 2,000 g. of ethylene was thus absorbed in the operation. The reactor was next depressured through a condensing system to remove the small amount of light hydrocarbons formed. Then the reaction mixture was allowed to settle, the upper layer was decanted and the lower immiscible catalyst sludge layer was discarded. The upper product layer was mixed with water to decompose any catalyst residues therein, and then steam distilled to remove undesired volatile hydrocarbon components. As is usual in the art, the product was clarified by clay treatment. This material was then used for the oxonation step.

The above polyethylene was oxonated by reacting 705 grams of the polyethylene with a mixture of carbon monoxide and hydrogen in a 1:1 mole ratio in the presence of 100 cc. of a hexane solution containing 2 wt. percent of cobalt carbonate as a catalyst. The cobalt carbonate is subsequently converted to cobalt carbonyl by the hydrogen. This reaction was carried out at a temperature of about 185° C. for about 8 hours and under a pressure of 2,000 p.s.i.g. The resulting reaction product was stripped in a short path still to a pot temperature of 215° C. at a pressure of 0.9 mm. Hg to remove the hexane, and the bottoms was filtered through Hyflo (diatomaceous earth) while hot to remove the catalyst. The yield of bottoms was 656 g. having a hydroxyl number of 15.3 mg.KOH/gm. The resulting product was then used in preparing a grease composition as follows:

A mixture was formed consisting of 10 parts by weight of the oxonated polyethylene as prepared above, 10 parts by weight of Hydrofol Acids 51 which is a mixture of hydrogenated fish oil acids corresponding in degree of unsaturation and molecular weight to stearic acid, and 68 parts by weight of a mineral lubricating oil having a viscosity of 55 SUS. at 210° F. This mixture was then mixed while warming to about 140° F. At this point 4 parts by weight of glacial acetic acid was then added to the kettle followed immediately by the addition of 7 parts by weight of sodium hydroxide in the form of a 40% aqueous solution. Heating was then again resumed until a final temperature of 615° F. was reached, at which time, heating was discontinued. The grease was allowed to cool to 500° F., at which point 1 weight percent of phenyl α-naphthylamine was added. This grease was further cooled to 150° F. and passed through a Gaulin homogenizer operating at 6,000 p.s.i.

EXAMPLE II

The grease of Example I was diluted back with 50 weight percent of mineral oil having a viscosity of 250 SUS. at 100° F., and an additional ½ wt. percent of phenyl α-naphthylamine was added. After mixing, this product was again passed through a Gaulin homogenizer operating at 6,000 p.s.i.

EXAMPLE III

Polyisobutylene having an average molecular weight of about 1,000 was oxonated under somewhat similar conditions to those used in Example I. A charge of 752 g. of polymer was oxonated at 200° C. for 8 hours under 2,000 p.s.i.g. with an equimolar mixture of CO and hydrogen, using a hexane solution of cobalt oleate as a catalyst (2 wt. percent cobalt based on polyisobutylene feed).

The product was stripped to a pot temperature of 215° C. at a pressure of 1.0 mm. Hg and then filtered through Hyflo while hot to remove the catalyst. The bottoms has the following analysis:

Hydroxyl No. = 21.6 mg.KOH/gm.
Saponification No. = 12.8 mg.KOH/gm.

A grease was prepared as follows: 10.0 parts of Hydrofol Acids 51, 10.0 parts of oxonated polybutene described above and 68.0 parts of a mineral lubricating oil having a viscosity of 55 SUS. at 210° F. were warmed to 150° F. while stirring. Then 7.0 parts sodium hydroxide was added in the form of an aqueous solution containing 40 wt. percent NaOH. Immediately after the sodium hydroxide was added, 4.0 parts of glacial acetic acid was added and the mixture heated to a maximum of 610° F., then cooled to 200° F. where 1.0 parts of phenyl α-naphthylamine was added, following which the grease was Gaulin homogenized at 6,000 p.s.i.

EXAMPLE IV

Oxonated polyethylene of Example I was 50% converted to the sodium salt by direct alkali fusion of the oxonated polyethylene. The fusion was carried out by heating at fusion temperatures sodium hydroxide flakes with the oxonated polyethylene until hydrogen evolution ceases. The resulting 50/50 wt. percent mixture of oxonated polyethylene and sodium salt of fused oxonated polyethylene was then used to prepare a grease.

Grease A

For comparison purposes, a grease was prepared in a manner similar to that of Example I using an oxonated polyethylene of only 230 mol. wt.

The compositions and physical properties of the greases of Examples I to IV and Grease A are summarized in the following tables:

| Compositions (Weight Percent) | Examples | | | | |
|---|---|---|---|---|---|
| | I | II | III | IV | Grease A |
| Oxonated polyethylene (600 mol. wt.) | 10.0 | 5.0 | | | |
| Oxonated polyisobutylene (1,000 mol. wt.) | | | 10.0 | | |
| 50/50 wt. mixture of oxonated polyethylene (600 mol. wt.) and its sodium fusion salt | | | | 15.0 | |
| Oxonated polyethylene (230 mol. wt.) | | | | | 10.0 |
| Hydrofol Acids 51 | 10.0 | 5.0 | 10.0 | 10.0 | 10.0 |
| Glacial Acetic Acid | 4.0 | 2.0 | 4.0 | 3.0 | 4.0 |
| Sodium hydroxide | 7.0 | 3.5 | 7.0 | 4.5 | 7.5 |
| Phenyl α-naphthylamine | 1.0 | 1.0 | 1.0 | 1.0 | 1.0 |
| Mineral lubricating oil (55 SUS. at 210° F.) | 68.0 | 33.5 | 68.0 | 66.5 | 67.5 |
| Mineral lubricating oil (250 SUS. at 100° F.) | | 50.0 | | | |

| Properties | Examples | | | | |
|---|---|---|---|---|---|
| | I | II | III | IV | Grease A |
| Appearance | Excellent | Excellent | Excellent | Excellent, very adhesive. | Excellent. |
| Dropping Point, °F | 500 | 440 | 500+ | 425 | |
| Penetration 77° F. mm./10: | | | | | |
|   Unworked | 190 | 255 | 260 | 275 | 100. |
|   Worked 60 Strokes | 195 | 260 | 290 | 295 | 210. |
|   Worked 100,000 Strokes | 210 | 275 | 300 | 300 | 208. |
| Water Solubility | | | Soluble | | |
|   Up to 165° F | Insoluble | | | | |
|   Below 150° F | | Insoluble | | | |
|   Boiling water | Soluble | | | | |
| Shell Roller Test—4 hrs. 77° F.: | | | | | |
| Micropenetrations 77° F.: | | | | | |
|   Initial | 119 | 125 | | | |
|   Final | 118 | 115 | | | |
|   Percent Change | | −8.0% | | | |
| Lubricating Life [1] (Hours) at 250° F.–10,000 r.p.m. | 2,710+ | 1,224 | 2,000+ | | |
| Norma Hoffmann Oxidation: Hours to 5 p.s.i. | 465 | | 425 | | |
| Crust formation | No crust after 12 mos. storage.[2] | | | | After 3 days formed crust.[3] |

[1] ABEC-NLGI Spindle Test.
[2] Penetration at 77° F. was 192 mm./10 after 12 months' storage.
[3] After one week the penetration at 77° F. (m/10) was 130 unworked, 175 worked 60 strokes and 208 worked 10,000 strokes.

As seen from the above tables, the grease of Example I, prepared from polyethylene, was an excellent high dropping point grease having a long lubricating life and which formed no crust and showed substantially no hardening after twelve months' storage. Example II illustrates that the grease of Example I may be further diluted with lubricating oil and still form an excellent product. Example III illustrates a grease prepared from polyisobutylene which also had good characteristics. Example IV illustrates a grease prepared from polyethylene which was only 50% fused to its sodium salt. This grease illustrates the fact that the unfused oxonated polyethylene per se may be used as a portion of the lubricating oil. Grease A, which was prepared from a low molecular weight polyethylene, illustrates the fact that the low molecular weight polymers result in greases having a pronounced tendency to form a crust and to harden during storage. Because of this, greases prepared from the high molecular weight olefin polymers are preferred.

While the preceding examples illustrate the use of the alkali fusion product of the oxonated polyolefin in conjunction with other fatty acid salts, greases may also be prepared directly from the fusion salt per se as the sole thickener. And although the preceding examples have shown mixed salt compositions prepared from the fusion salt in conjunction with low and high molecular weight fatty acid other various combinations of the fusion salt and fatty acids may be prepared. To illustrate, Example I may be repeated but using 4 wt. percent of caprylic acid in place of the Hydrofol Acids 51 to thereby form a softer grease. Or Example I may be repeated but using 3 wt. percent less of the mineral oil and adding 3 wt. percent of caprylic acid to thereby form a mixed salt from the fusion acid, acetic acid, caprylic acid, and the Hydrofol Acids 51.

What is claimed is:

1. A lubricating oil composition comprising a major amount of lubricating oil and a thickening amount of alkali metal salt formed by the alkali fusion of an oxonated polymer of a $C_2$ to $C_{20}$ aliphatic olefin, said polymer having a molecular weight of about 500 to 10,000 and said oxonated polymer having been prepared by reacting said polymer with carbon monoxide and hydrogen at a temperature of about 200 to 400° F. and a pressure of about 30 to 400 atmospheres, the volume of hydrogen per volume of carbon monoxide being in the ratio of about 0.5 to 10.0 volumes of hydrogen per volume of carbon monoxide.

2. A lubricating grease composition comprising a major proportion of a lubricating oil and a grease thickening amount of a mixed salt grease thickener comprising 0.5 to 5 molar proportions of an alkali metal salt of a $C_1$ to $C_6$ fatty acid, 0.5 to 2 molar proportions of an alkali metal salt of a $C_{13}$ to $C_{30}$ fatty acid and one molar proportion of an alkali metal salt formed by the alkali fusion of an oxonated polymer of a $C_2$ to $C_{20}$ aliphatic olefin, said polymer having a molecular weight of 500 to 10,000, said oxonated polymer having been prepared by reacting said polymer with carbon monoxide and hydrogen at a temperature of about 200 to 400° F. and a pressure of about 30 to 400 atmospheres, the volume of hydrogen per volume of carbon monoxide being in the ratio of 0.5 to 10.0 volumes of hydrogen per volume of carbon monoxide.

3. A lubricating grease composition according to claim 2, wherein said lubricating oil is mineral oil and said alkali metal is sodium.

4. A lubricating grease composition according to claim 2, wherein said mixed salt grease thickener also contains 0.5 to 2 molar proportions of an alkali metal salt of a $C_7$ to $C_{12}$ fatty acid.

5. A process for preparing a lubricating grease composition comprising a major proportion of a mineral lubricating oil and a minor proportion of a complex mixed salt grease thickener, which comprises reacting one molar proportion of an oxonated olefin polymer wherein said polymer has a molecular weight of about 500 to 10,000 and is prepared from a $C_2$ to $C_{20}$ aliphatic olefin, 0.5 to 5 molar proportions of a $C_1$ to $C_6$ fatty acid and 0.5 to 2 molar proportions of a $C_{13}$ to $C_{30}$ fatty acid with alkali metal hydroxide for a time and temperature sufficient to fuse said oxonated polymer and to form said mixed salt thickener, said oxonated polymer having been prepared by reacting said polymer with carbon monoxide and hydrogen at a temperature of about 200 to 400° F. and a pressure of about 30 to 400 atmospheres, the volume of hydrogen per volume of carbon monoxide being in the ratio of 0.5 to 10.0 volumes of hydrogen per volume of carbon monoxide.

6. A process according to claim 5, wherein said fusion and complex formation is carried out at a temperature of about 450° to 700° F.

7. A process according to claim 5, wherein said alkali metal hydroxide is sodium hydroxide.

8. A lubricating oil composition comprising a major amount of a lubricating oil and 1–40 wt. percent of an alkali metal salt formed by the alkali fusion of an oxonated polymer of a $C_2$ to $C_{20}$ aliphatic olefin, said polymer having a molecular weight of about 600 to 2,000.

References Cited in the file of this patent

UNITED STATES PATENTS

| | | |
|---|---|---|
| 2,557,701 | Smith | June 19, 1951 |
| 2,801,971 | Bartlett et al. | Aug. 6, 1957 |
| 2,801,973 | Morway et al. | Aug. 6, 1957 |
| 2,801,977 | Morway et al. | Aug. 6, 1957 |